United States Patent
Li

(10) Patent No.: US 8,270,574 B2
(45) Date of Patent: Sep. 18, 2012

(54) EMERGENCY CALLS IN INTERNET PROTOCOL MULTIMEDIA SUBSYSTEM (IMS) OVER EVOLVED PACKET CORE (EPC) NETWORKS

(75) Inventor: Mingxing Li, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 476 days.

(21) Appl. No.: 12/555,179

(22) Filed: Sep. 8, 2009

(65) Prior Publication Data

US 2011/0058658 A1    Mar. 10, 2011

(51) Int. Cl.
*H04M 11/04* (2006.01)
(52) U.S. Cl. ........ 379/45; 370/353; 370/354; 455/404.1
(58) Field of Classification Search ............. 379/45; 370/352, 353, 354; 455/404.1, 401.1
See application file for complete search history.

(56) References Cited

U.S. PATENT DOCUMENTS

| | | | | |
|---|---|---|---|---|
| 2007/0254625 | A1* | 11/2007 | Edge | 455/404.1 |
| 2010/0124897 | A1* | 5/2010 | Edge | 455/404.1 |
| 2010/0246780 | A1* | 9/2010 | Bakker et al. | 379/38 |

* cited by examiner

*Primary Examiner* — Gerald Gauthier
*Assistant Examiner* — Simon King

(57) ABSTRACT

A device receives an emergency call invite generated by a user device associated with an Internet protocol (IP) multimedia subsystem (IMS) media gateway, and forwards the emergency call invite to a location resource function/route determination function (LRF/RDF) device for determining public safety answering point (PSAP) routing information. The device receives, from the LRF/RDF device, the PSAP routing information based on the emergency call invite, and routes the emergency call invite to a particular PSAP based on the PSAP routing information. If the emergency call invite is routed to a legacy PSAP, the emergency call is routed to the legacy PSAP via legacy mobile switching center (MSC) direct trunks. If the emergency call invite is routed to an IP PSAP, the emergency call is routed to the IP PSAP via an IP connection.

21 Claims, 11 Drawing Sheets

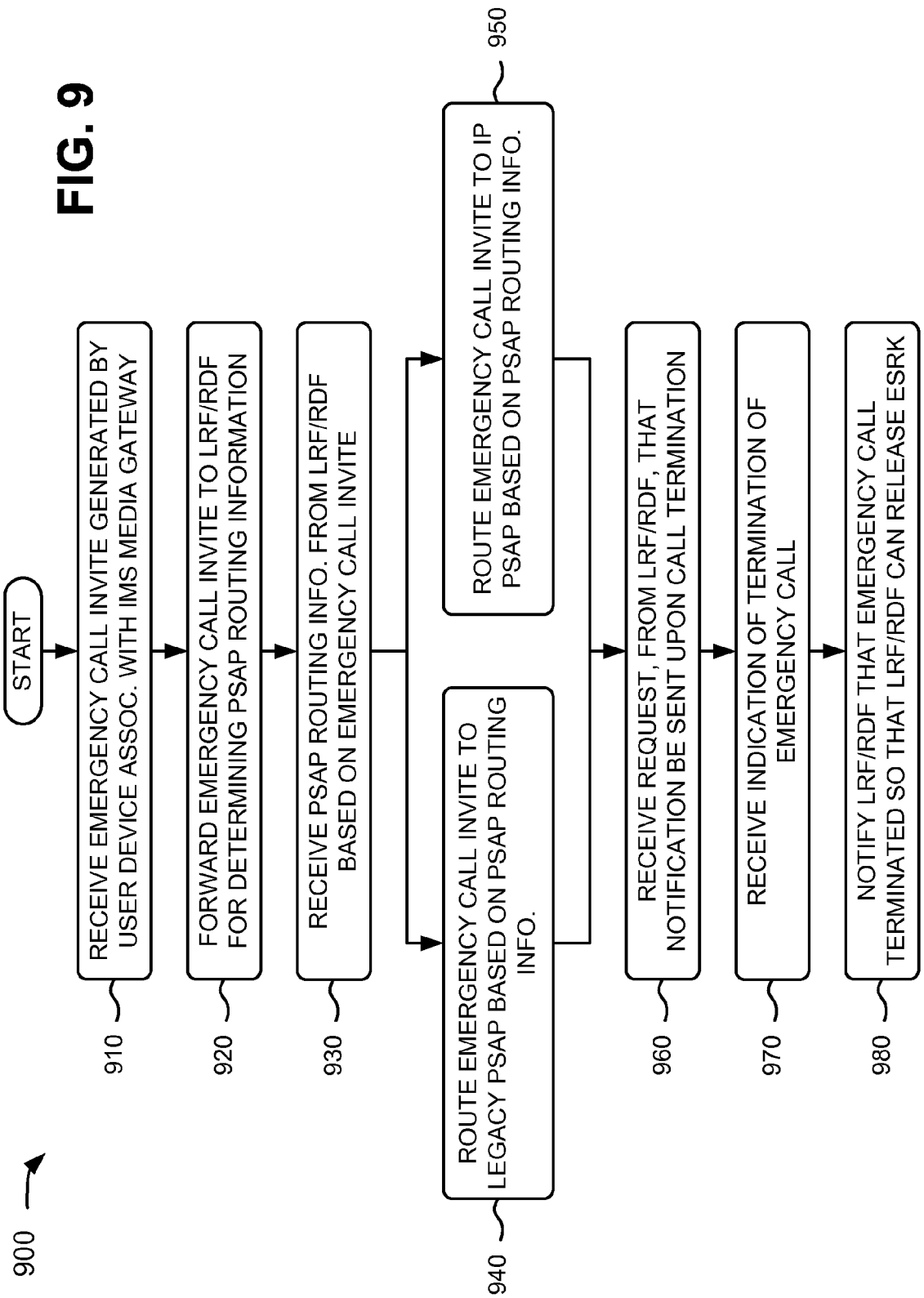

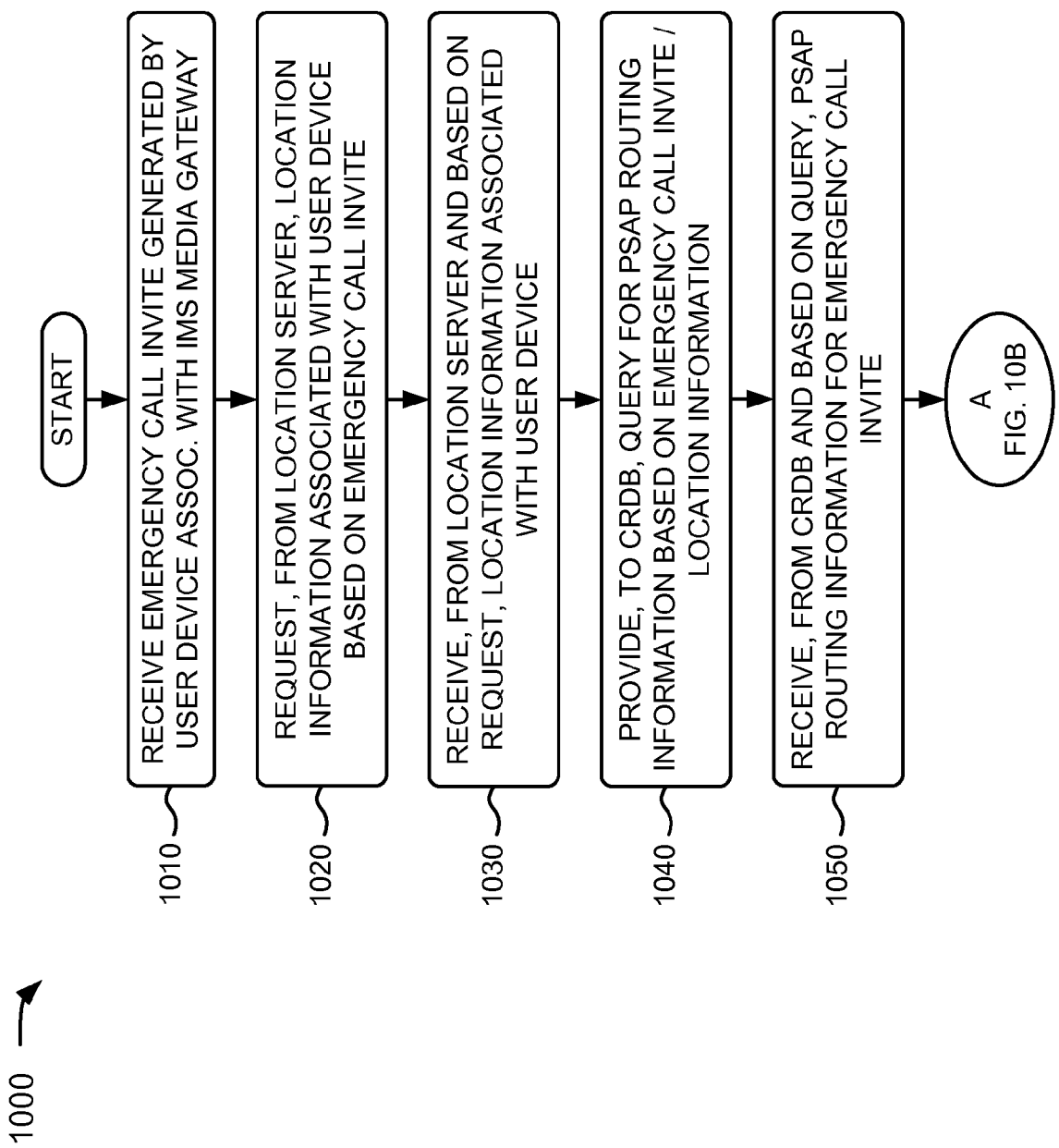

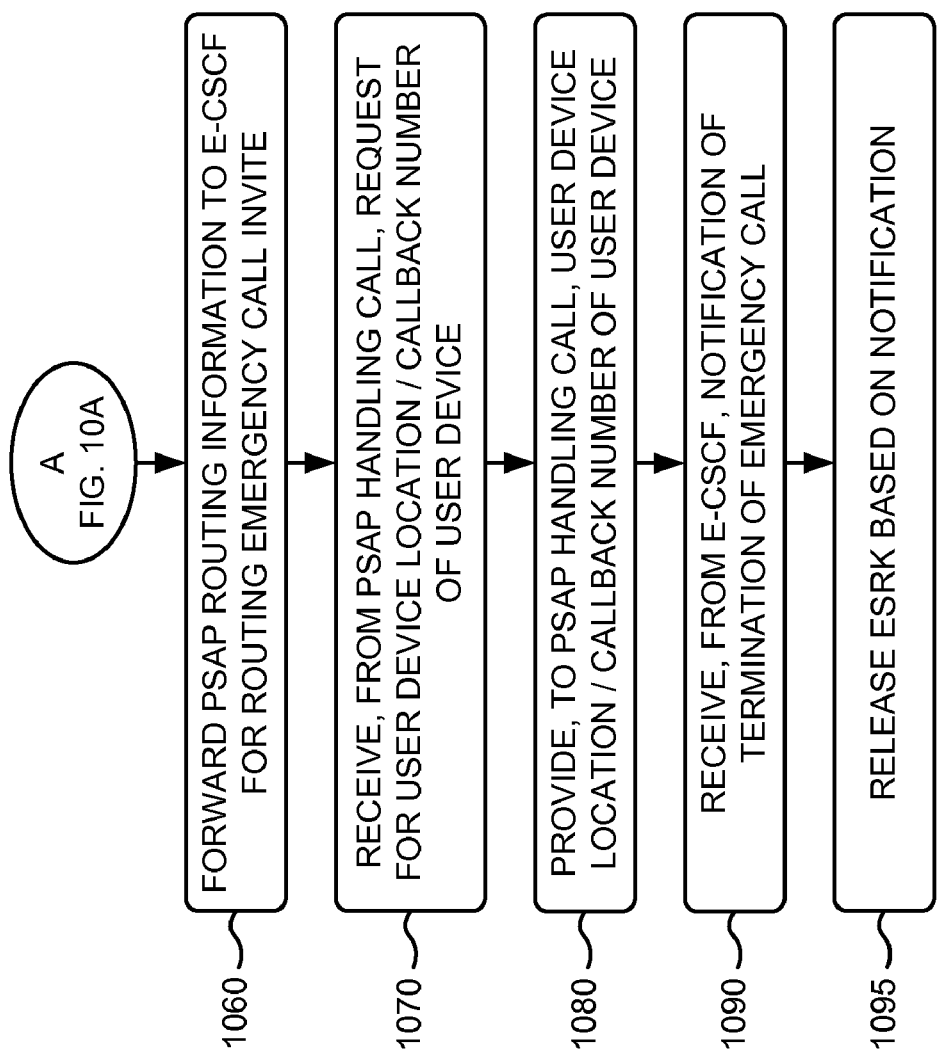

EMERGENCY CALLS IN INTERNET PROTOCOL MULTIMEDIA SUBSYSTEM (IMS) OVER EVOLVED PACKET CORE (EPC) NETWORKS

BACKGROUND

Internet protocol (IP) multimedia subsystem (IMS) is a new architecture developed so that IP networks can rapidly deploy new IP-based multimedia services. An evolved packet system (EPS) is a next generation packet network architecture developed by the 3rd Generation Partnership Project (3GPP). EPS includes long term evolution (LTE) access networks and evolved packet core (EPC) networks (also referred to as system architecture evolution (SAE) networks). IMS over SAE/EPC networks is envisioned to be a next generation network architecture that supports a variety of access technologies and provides advanced IP multimedia services with seamless mobility.

To support emergency services (e.g., "911" calls) in IMS, a special serving call session control function (CSCF) has been developed for the IMS architecture, and is called an emergency serving CSCF (E-CSCF). The E-CSCF performs call processing of emergency calls. For example, the E-CSCF queries a location resource function (LRF) to determine a location of a caller, queries a route determination function (RDF) to determine where to route the emergency call, and actually routes the emergency call to a correct public safety answering point (PSAP) (e.g., a final destination of an emergency call where a "911" operator is located). In current "legacy" single-carrier radio transmission technology (1xRTT) networks, each mobile switching center (MSC) queries a mobile position center (MPC) to receive an emergency service routing key (ESRK) using a request message (e.g., an ORREQ message). Based on the returned ESRK, a serving MSC routes the emergency call to a selective router (SR) via a direct or dedicated trunk. The SR forwards the emergency call to a PSAP identified by the ESRK. Direct trunks (e.g., centralized automatic message accounting (CAMA) trunks, feature group D (FG-D) trunks, signaling system 7 (SS7) trunks, etc.) are required and used to connect a MSC and a SR. One of the main reasons for using direct or dedicated trunks is to shield the emergency network from outside interference. Once the emergency call reaches the SR, the SR routes the emergency call to a correct PSAP.

To support emergency calls in IMS-based networks, it has been proposed to route the IMS-based emergency calls to an emergency service IP PSAP network (i.e., an ESInet—a proposed emergency network that interconnects IP-capable PSAPs). Under such a proposal, IMS-based networks would deliver the emergency call (e.g., via IP) to the ESInet, and the ESInet would route the emergency call (e.g., via IP) to a PSAP. Eventually, the use of IP for emergency call delivery will preclude the use of direct trunks. However, it will still take significant time before all PSAPs are compatible with IP. Before the ESInet becomes available, IMS-based emergency calls need to be routed to several hundred legacy SRs which require direct trunks. Since IMS-based networks are typically deployed at a few centralized locations via a small number of media gateways that reach legacy (e.g., the Public Switched Telephone Network (PSTN)) networks, supporting emergency call routing to several hundred SRs would require setting up thousands direct trunks (e.g., including redundant connections) to the several hundred SRs from a few IMS media gateway locations. Implementing thousands of direct trunks to support IMS-based emergency calls would be expensive to setup and maintain.

BRIEF DESCRIPTION OF THE DRAWINGS

FIG. 9 depicts a flow chart of an exemplary process for routing an emergency call, in IMS and over an SAE/EPC network, to either a legacy PSAP or an IP PSAP according to implementations described herein; and FIGS. 10A and 10B illustrate a flow chart of an exemplary process for routing an emergency call in IMS and over an SAE/EPC network according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods that may support emergency service in IMS over SAE/EPC networks. The systems and/or methods may route IMS-based emergency calls to either legacy SRs or ESRPs depending on a capability of a PSAP. With the systems and/or methods, supporting emergency calls to legacy PSAPs in IMS may preclude installing and maintaining thousands of direct trunks to legacy SRs from a few IMS media gateways, and may result in significant cost savings. The systems and/or methods may also take advantage of the conversion of legacy MSCs to TrFO MSCs, because TrFO MSCs may enable emergency calls to be routed without using dedicated trunks.

In one exemplary implementation, the systems and/or methods may receive an emergency call invite generated by a user device associated with an IMS media gateway, and may forward the emergency call invite to a LRF/RDF for determining PSAP routing information. The systems and/or methods may receive PSAP routing information from the LRF/RDF based on the emergency call invite, and may route the emergency call invite to either a legacy PSAP or an IP PSAP based on the PSAP routing information. The systems and/or methods may further receive a request, from the LRF/RDF, that a notification be sent upon termination of the emergency call, may receive indication of termination of the emergency call, and may notify the LRF/RDF that the emergency call terminated so that the LRF/RDF can release an ESRK associated with the emergency call.

As used herein, the terms "user" and "caller" are intended to be broadly interpreted to include a user device or a user of a user device.

Figure 1:
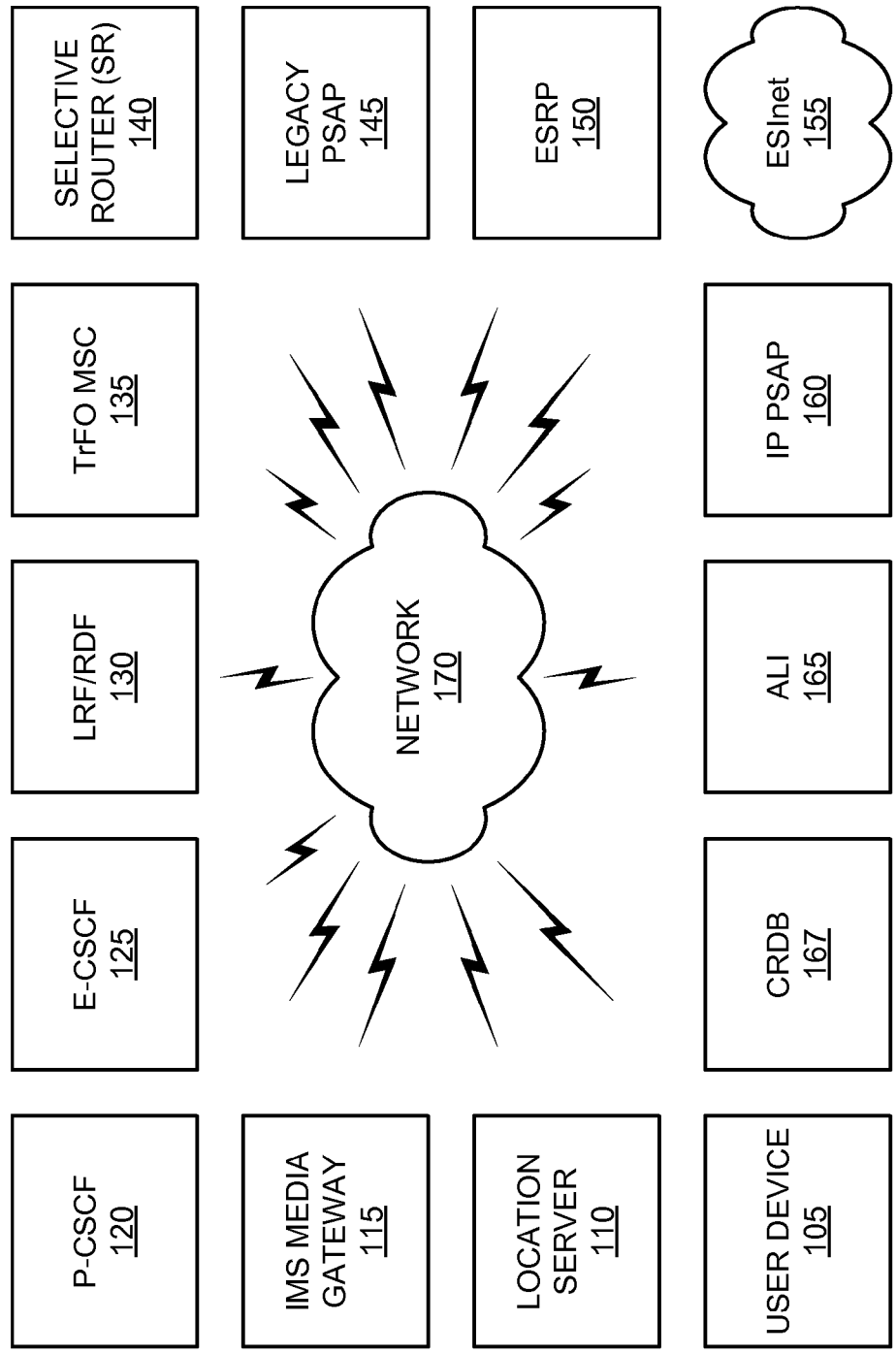
FIG. 1 depicts a diagram of an exemplary network in which systems and/or methods described herein may be implemented.

FIG. 1 is a diagram of an exemplary network 100 in which systems and/or methods described herein may be implemented. As illustrated, network 100 may include a user device 105, a location server 110, an IMS media gateway 115, a P-CSCF 120, an E-CSCF 125, a LRF/RDF 130, a TrFO MSC 135, a SR 140, a legacy PSAP 145, an ESRP 150, an ESInet 155, an IP PSAP 160, and an ALI database server 165 interconnected by a network 170. Components of network 100 may interconnect via wired and/or wireless connections. A single user device 105, location server 110, IMS media gateway 115, P-CSCF 120, E-CSCF 125, LRF/RDF 130, TrFO MSC 135, SR 140, legacy PSAP 145, ESRP 150, ESInet 155, IP PSAP 160, ALI database server 165, and network 170 have been illustrated in FIG. 1 for simplicity. In practice, there may be more user devices 105, location servers 110, IMS media gateways 115, P-CSCFs 120, E-CSCFs 125, LRF/RDFs 130, TrFO MSCs 135, SRs 140, legacy PSAPs 145, ESRPs 150, ESInets 155, IP PSAPs 160, ALI database servers 165, and/or networks 170. Also, in some instances, one or more of the components of network 100 may perform one or more functions described as being performed by another one or more of the components of network 100.

User device 105 (also referred to as user equipment) may include a radiotelephone, a personal communications system (PCS) terminal (e.g., that may combine a cellular radiotelephone with data processing and data communications capabilities), a wireless telephone, a cellular telephone, a smart phone, a PDA (e.g., that can include a radiotelephone, a pager, Internet/intranet access, etc.), a laptop computer (e.g., with a broadband air card), or other types of mobile communication devices. In an exemplary implementation, user device 105 may include a device that is capable of communicating in IMS over SAE/EPC networks and supports emergency calls (e.g., "911" calls) in IMS over such EPC networks.

Location server 110 may include one or more server devices, or other types of computation or communication devices, that gather, process, search, and/or provide information in a manner described herein. In an exemplary implementation, location server 110 may provide a secure user plane location (SUPL) platform (or other similar platforms) that may interact with user device 105 (or network platforms) to obtain a location (e.g., global positioning system (GPS) coordinates) associated with user device 105.

IMS media gateway 115 may include a data transfer device, such as a gateway, a router, a switch, a firewall, a network interface card (NIC), a hub, a bridge, a proxy server, an optical add-drop multiplexer (OADM), or some other type of device that processes and/or transfers data. In an exemplary implementation, IMS media gateway 115 may include a translation device that converts media streams between disparate telecommunications networks (e.g., PSTN, SS7, next generation networks, etc.). IMS media gateway 115 may enable multimedia communications across next generation networks over multiple transport protocols such as asynchronous transfer mode (ATM) and IP. In one example, IMS media gateway 115 may support emergency calls in IMS over SAE/EPC networks.

P-CSCF 120 may include one or more server devices, or other types of computation or communication devices, that gather, process, search, and/or provide information in a manner described herein. In an exemplary implementation, P-CSCF 120 may function as a proxy server for user device 105, where session initiation protocol (SIP) signaling traffic to and from user device 105 may go through P-CSCF 120. P-CSCF 120 may validate and then forward requests from user device 105, and may process and forward responses to user device 105.

E-CSCF 125 may include one or more server devices, or other types of computation or communication devices, that gather, process, search, and/or provide information in a manner described herein. In an exemplary implementation, E-CSCF 125 may perform call processing of emergency calls for the IMS architecture. For example, E-CSCF 125 may query a LRF (e.g., LRF/RDF 130) to determine a location of a caller, may query a RDF (e.g., LRF/RDF 130) to determine where to route an emergency call, and may route the emergency call to a correct PSAP (e.g., legacy PSAP 145 or IP PSAP 160).

LRF/RDF 130 may include one or more server devices, or other types of computation or communication devices, that gather, process, search, and/or provide information in a manner described herein. In an exemplary implementation, LRF/RDF 130 may perform a LRF that supplies E-CSCF 130 with location information relating to IMS users (e.g., user device 105) who have placed an emergency call. The location information, which may be obtained through interaction between LRF/RDF 130 and an IP connectivity access network (IP-CAN), may be passed to a nearest PSAP (e.g., legacy PSAP 145 or IP PSAP 160) via E-CSCF 130. LRF/RDF 130 may perform a RDF that determines routing information of an appropriate PSAP for an emergency call (e.g., based on the caller's location). LRF/RDF 130 may query a mapping database to obtain routing addresses of PSAPs.

TrFO MSC 135 may include one or more server devices, or other types of computation or communication devices, that gather, process, search, and/or provide information in a manner described herein. In an exemplary implementation, TrFO MSC 135 may include a service delivery node responsible for handling voice calls as well as other services (e.g., conference calls, circuit switched data, etc.). TrFO MSC 135 may set up and release an end-to-end connection, may handle mobility and hand-over requirements during a call, and may handle charging and real time pre-paid account monitoring. TrFO MSC 135 may transport compressed speech (e.g., from legacy user devices) in a packet transport network through elimination of unnecessary coding and decoding of the signal by intermediate elements in the bearer path.

Selective router (SR) 140 may include a data transfer device, such as a gateway, a router, a switch, a firewall, a network interface card (NIC), a hub, a bridge, a proxy server, an optical add-drop multiplexer (OADM), or some other type of device that processes and/or transfers data. In an exemplary implementation, SR 140 may include routing and equipment used to route an emergency call to the proper PSAP (e.g., legacy PSAP 145 or IP PSAP 160). In one example, TrFO MSC 135 (e.g., based on an ESRK) may route an emergency call to SR 140 via a dedicated trunk. SR 140 may forward the emergency call to a PSAP identified by the ESRK.

Legacy PSAP 145 may include one or more server devices, or other types of computation or communication devices, that gather, process, search, and/or provide information in a manner described herein. In an exemplary implementation, legacy PSAP 145 may be responsible for answering emergency calls provided via legacy devices (e.g., TrFO MSC 135, SR 140, etc.). Legacy PSAP 150 may communicate with emergency personnel (e.g., police, fire, and/or ambulance services) (not shown) to provide information associated with emergency calls.

ESRP 150 may include one or more server devices, or other types of computation or communication devices, that gather, process, search, and/or provide information in a manner described herein. In an exemplary implementation, ESRP 150 may include a SIP routing device that forwards an emergency call to a most appropriate PSAP (e.g., via ESInet 155).

ESInet 155 may include a network of one or more server devices, or other types of computation or communication devices, that gather, process, search, and/or provide information in a manner described herein. In an exemplary implementation, ESInet 155 may include an emergency network that interconnects IP-capable PSAPs (e.g., IP PSAP 160). IMS-based networks may deliver an emergency call (e.g., via IP) to ESInet 155, and ESInet 155 may route the emergency call (e.g., via IP) to a PSAP (e.g., to IP PSAP 160).

IP PSAP 160 may include one or more server devices, or other types of computation or communication devices, that gather, process, search, and/or provide information in a manner described herein. In an exemplary implementation, IP PSAP 160 may be responsible for answering emergency calls provided via IP devices (e.g., ESRP 150, ESInet 155, etc.). IP PSAP 160 may communicate with emergency personnel (e.g., police, fire, and/or ambulance services) (not shown) to provide information associated with emergency calls.

ALI database server 165 (hereinafter referred to as "ALI 165") may include one or more server devices, or other types of computation or communication devices, that gather, process, search, and/or provide information in a manner described herein. In an exemplary implementation, ALI 165 may include a subscriber database that matches phone numbers to names and addresses. When an emergency call arrives at a PSAP, the PSAP may use this database to determine an address that matches a phone number associated with the emergency call.

Call routing database (CRDB) server 167 (hereinafter referred to as "CRDB 167") may include one or more server devices, or other types of computation or communication devices, that gather, process, search, and/or provide information in a manner described herein. In an exemplary implementation, CRDB 167 may be maintained by LRF/RDF 130 and may include a local routing table or database (i.e., a call routing database). The table or database may include a mapping of user locations to PSAP routing information (e.g., such as ESRKs).

Network 170 may include a local area network (LAN), a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of networks. In one exemplary implementation, network 170 may include a network that supports IMS over SAE/EPC networks.

Although FIG. 1 shows exemplary components of network 100, in other implementations, network 100 may contain fewer, different, differently arranged, or additional components than depicted in FIG. 1. For example, network 100 may include other IMS over SAE/EPC related devices, such as base stations (e.g., also referred to as "eNodeBs") that may connect user device 105 to IMS media gateway 115; mobile management entities (MMEs) that may perform signaling and control functions to manage user device 105 access to network connections, assignment of network resources, and management of the mobility states to support tracking, paging, roaming, and handovers; etc.

Figure 2:
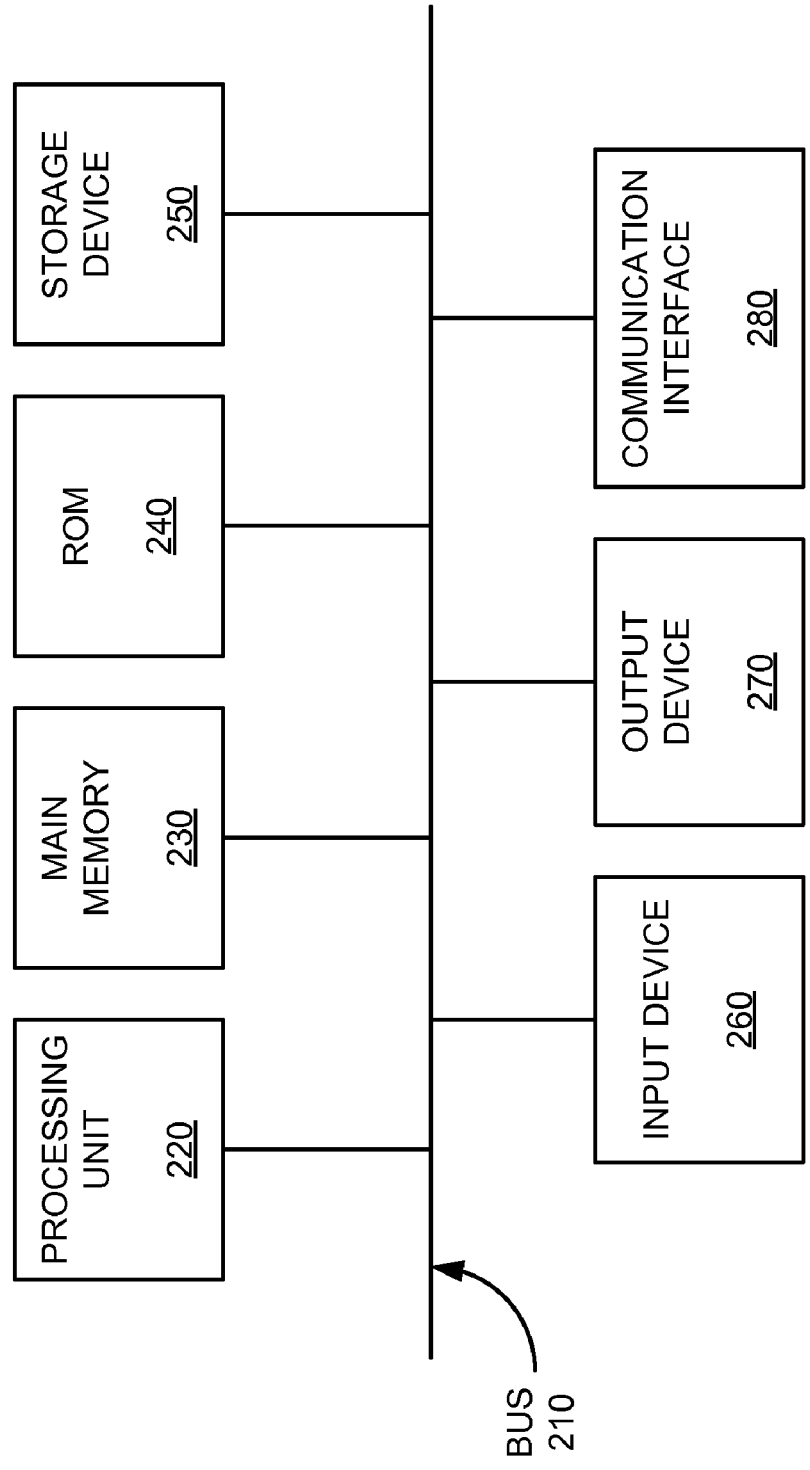
FIG. 2 illustrates a diagram of exemplary components of a location server, an IMS media gateway, a proxy-CSCF (P-CSCF), an E-CSCF, a LRF/RDF, a transcoder free operation MSC (TrFO MSC), a SR, a legacy PSAP, an emergency service routing proxy (ESRP), an IP PSAP, an automatic location identification (ALI) database server, and/or a Call routing database (CRDB) server of the network depicted in FIG. 1.

FIG. 2 is an exemplary diagram of a device 200 that may correspond to one or more of the devices depicted in FIG. 1. For example, device 200 may correspond to location server 110, IMS media gateway 115, P-CSCF 120, E-CSCF 125, LRF/RDF 130, TrFO MSC 135, SR 140, legacy PSAP 145, ESRP 150, IP PSAP 160, ALI 165, and/or CRDB 167. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 170.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Figure 3:
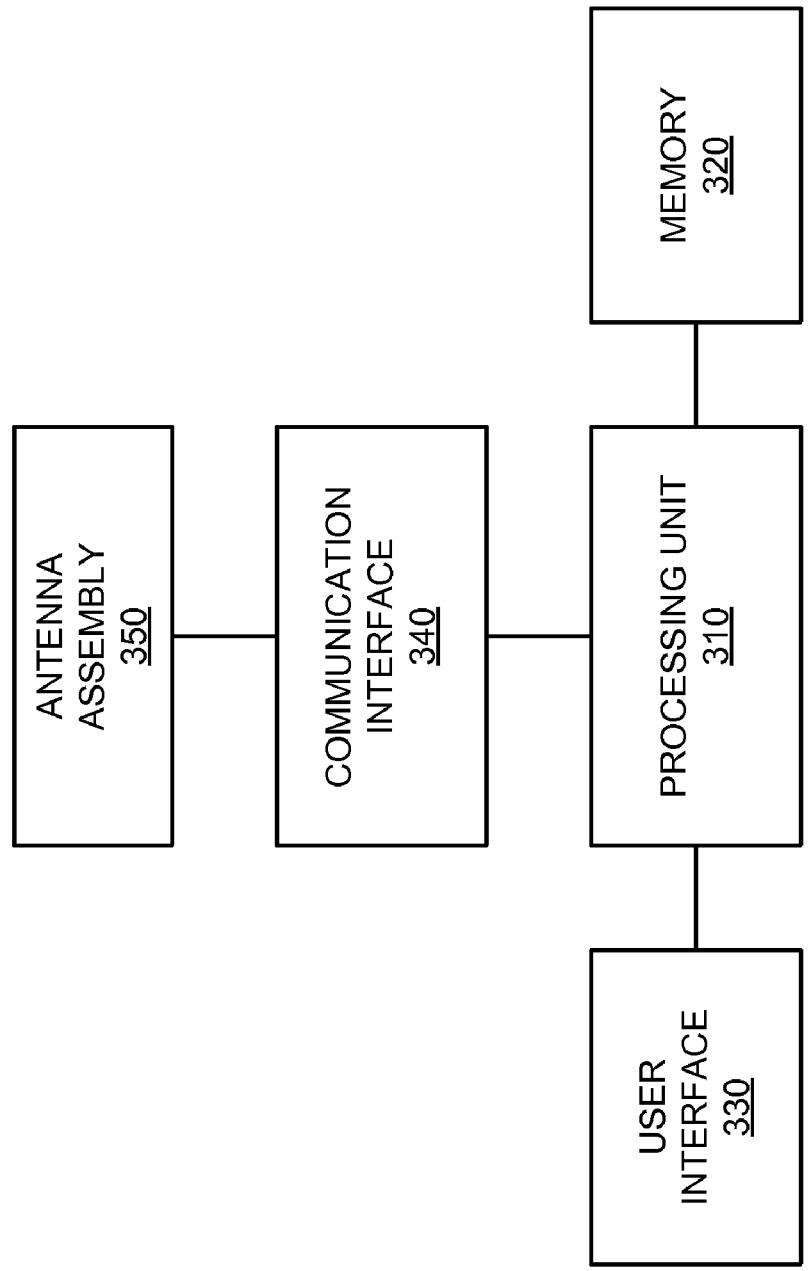
FIG. 3 depicts a diagram of exemplary components of a user device of the network illustrated in FIG. 1.

FIG. 3 depicts a diagram of exemplary components of a device 300 that may correspond to, for example, user device 105. As illustrated, device 300 may include a processing unit 310, memory 320, a user interface 330, a communication interface 340, and/or an antenna assembly 350.

Processing unit 310 may include one or more processors, microprocessors, application specific integrated circuits (ASICs), field programmable gate arrays (FPGAs), or the like. Processing unit 310 may control operation of device 300 and its components. In one implementation, processing unit 310 may control operation of components of device 300 in a manner described herein.

Memory 320 may include a random access memory (RAM), a read-only memory (ROM), and/or another type of memory to store data and instructions that may be used by processing unit 310.

User interface 330 may include mechanisms for inputting information to device 300 and/or for outputting information from device 300. Examples of input and output mechanisms might include buttons (e.g., control buttons, keys of a keypad, a joystick, etc.) or a touch screen interface to permit data and control commands to be input into device 300; a speaker to receive electrical signals and output audio signals; a microphone to receive audio signals and output electrical signals; a display to output visual information (e.g., text input into device 300); and/or a vibrator to causer device 300 to vibrate.

Communication interface 340 may include, for example, a transmitter that may convert baseband signals from processing unit 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and/or reception of the RF signals.

Antenna assembly 350 may include one or more antennas to transmit and/or receive RF signals over the air. Antenna assembly 350 may, for example, receive RF signals from communication interface 340 and transmit them over the air, and receive RF signals over the air and provide them to communication interface 340. In one implementation, for example, communication interface 340 may communicate with a network and/or devices connected to a network (e.g., network 170).

As will be described in detail below, device 300 may perform certain operations described herein in response to processing unit 310 executing software instructions of an application contained in a computer-readable medium, such as memory 320. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, differently arranged, or additional components than depicted in FIG. 3. In still other implementations, one or more components of device 300 may perform one or more other tasks described as being performed by one or more other components of device 300.

Figure 4:
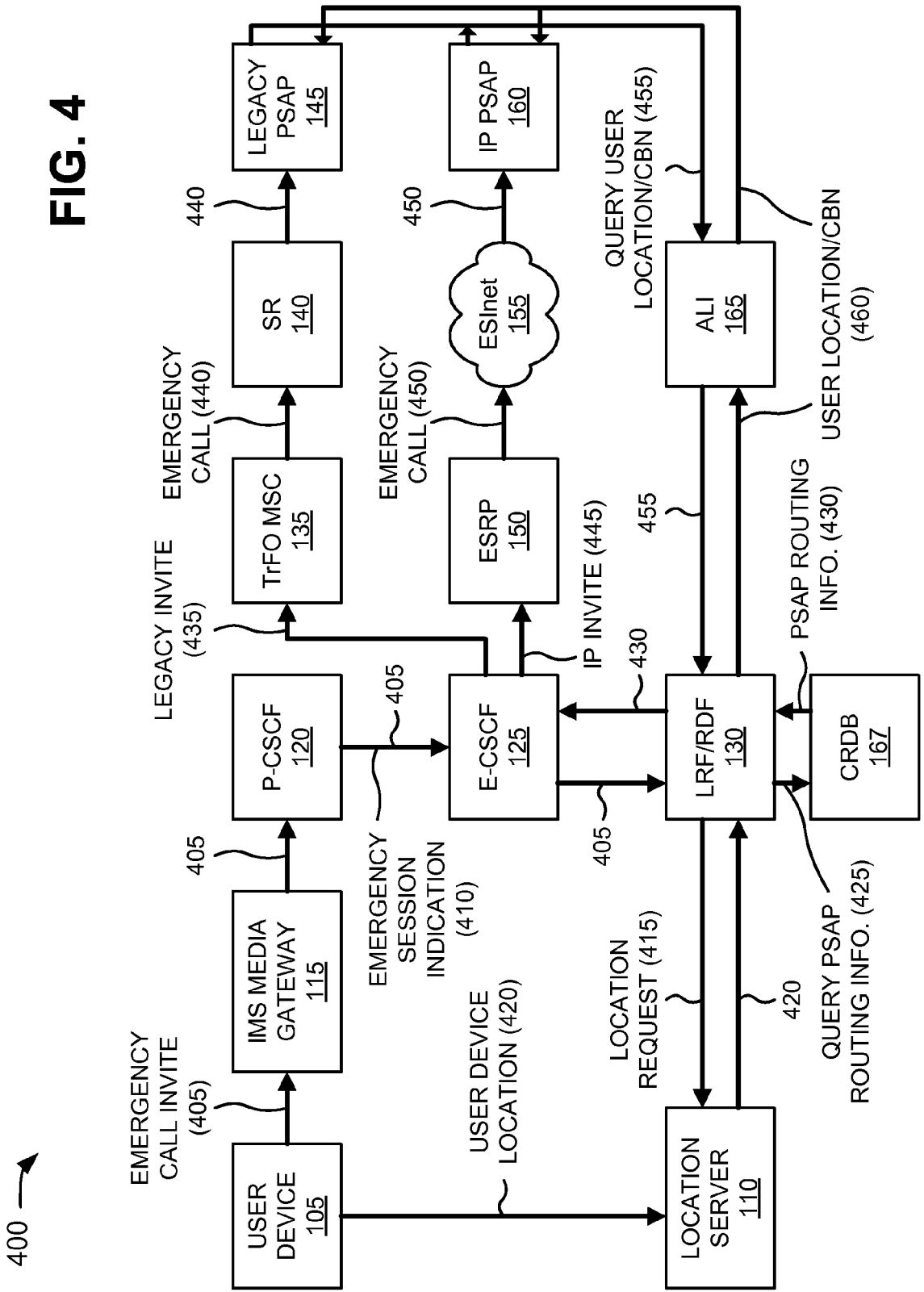
FIG. 4 illustrates a diagram of exemplary interactions among components of an exemplary portion of the network depicted in FIG. 1.

FIG. 4 illustrates a diagram of exemplary interactions among components of an exemplary portion 400 of network 100. As shown, exemplary network portion 400 may include user device 105, location server 110, IMS media gateway 115, P-CSCF 120, E-CSCF 125, LRF/RDF 130, TrFO MSC 135, SR 140, legacy PSAP 145, ESRP 150, ESInet 155, IP PSAP 160, and ALI 165. User device 105, location server 110, IMS media gateway 115, P-CSCF 120, E-CSCF 125, LRF/RDF 130, TrFO MSC 135, SR 140, legacy PSAP 145, ESRP 150, ESInet 155, IP PSAP 160, and ALI 165 may include the features described above in connection with, for example, FIGS. 1-3.

As further shown in FIG. 4, when a user initiates an emergency call, user device 105 may generate an emergency call SIP invite message 405 (hereinafter referred to as "emergency call invite 405"). Emergency call invite 405 may include an emergency session establishment request that includes an emergency session indication, an emergency/public user identifier, and a telephone uniform resource identifier (Tel URI) associated with the public user identifier (e.g., if available). User device 105 may provide emergency call invite 405 (which includes e.g., an emergency session indication 410) to IMS media gateway 115. In an exemplary implementation, user device 105 may provide emergency call invite 405 to IMS media gateway 115 via IMS and SAE/EPC network elements (e.g., via a base station, a MME, etc.). IMS media gateway 115 may receive emergency call invite 405 and may forward emergency call invite 405 to P-CSCF 120.

P-CSCF 120 may receive emergency call invite 405 from IMS media gateway 115 and may detect emergency session indication 410 based on information provided in emergency call invite 405. P-CSCF 120 may select an E-CSCF (e.g., E-CSCF 125) to handle the emergency session provided by emergency session indication 410. P-CSCF 120 may forward emergency session indication 410 by passing emergency call invite 405 to E-CSCF 125.

E-CSCF 125 may receive emergency call invite 405 from P-CSCF 120 and may interact with LRF/RDF 130 to obtain information for routing the emergency call to a correct PSAP. In one example, E-CSCF 125 may provide emergency call invite 405 to LRF/RDF 130. LRF/RDF 130 may receive emergency call invite 405 and may check for caller location information (e.g., associated with the user of user device 105). LRF/RDF 130 may generate a location request 415 based on emergency call invite 405. Location request 415 may include a request for location information (e.g., GPS coordinates) associated with user device 105. LRF/RDF 130 may provide location request 415 to location server 110, and location server may determine a user device location 420 (e.g., GPS coordinates associated with user device 105) based on location request 415 and via communication with user device 105. In one example, location server 110 may utilize a SUPL location platform (or other similar platforms) to interact with user device 105 to obtain a GPS location of user device 105. Location server 110 may provide user device location 420 to LRF/RDF 130. In an exemplary implementation, location server 110 may provide user device location 420 to LRF/RDF 130 when LRF/RDF 130 provides PSAP routing information to E-CSCF 125.

If a location parameter (e.g., a SectorID parameter) is included in emergency call invite 405 (e.g., within a P-Access-Network-Info (PANI) portion of emergency call invite 405), LRF/RDF 130 may utilize information provided in the location parameter (and/or user device location 420) to formulate a query 425 for PSAP routing information. LRF/RDF 130 may provide query 425 for PSAP routing information to a local routing database (e.g., CRDB 167), and CRDB 167 may return appropriate PSAP routing information 430 for the emergency call based on query 425 (e.g., based on user device location 420, the location parameter, etc.). PSAP routing information 430 may include an ESRK and an identifier (e.g., a URI) for an ESRP (e.g., ESRP 150) if a determined PSAP is IP-capable. If the determined PSAP is not IP-capable, PSAP routing information 430 may include an ESRK and an identifier (e.g., a URI) for a TrFO MSC (e.g., TrFO MSC 135). In one example, PSAP routing information 430 may include a P-Asserted-ID field that contains the ESRK and a contact header that contains an identifier (e.g., a URI) for an ESRP or a TrFO MSC. LRF/RDF 130 may receive PSAP routing information 430 and may provide PSAP routing information 430 to E-CSCF 125 (e.g., via a "300" multiple choice SIP message).

E-CSCF 125 may receive PSAP routing information 430 from LRF/RDF 130 and may forward emergency call invite 405 to either TrFO 135 or ESRP 150 based on PSAP routing information 430. For example, if PSAP routing information 430 includes a URI of a TrFO MSC (e.g., TrFO MSC 135), E-CSCF 125 may provide a legacy invite 435 to TrFO MSC 135. If legacy invite 435 encapsulates a SS7 initial address message (IAM), a called party number field in legacy invite 435 may include an ESRK. If legacy invite 435 does not encapsulate a SS7 IAM, a request URI field in legacy invite 435 may take the form of "ESRK@TrFO-MSC-fully-qualified-domain-name." In either case, E-CSCF 125 may format legacy invite 435 such that when TrFO MSC 135 receives legacy invite 435, it may direct the call to a direct trunk that leads to a correct PSAP based on the ESRK in the request URI or the called party number field with minimal modification to legacy invite 435. TrFO MSC 135 may receive legacy invite 435 and may translate legacy invite 435 into a format that may be understood by other legacy devices (e.g., by SR 140, legacy PSAP 145, etc.). Based on legacy invite 435, TrFO MSC 135 may provide an emergency call 440 (e.g., the emergency call initiated by user device 105) to legacy PSAP 145 via a dedicated trunk (e.g., via SR 140). Legacy PSAP 145 may receive emergency call 440, may query 455 a user's location and callback number (CBN) via LRF/RDF 130 and ALI 165, and may receive a user's location/CBN 460 based on query 455. Legacy PSAP 145 may provide appropriate emergency services in a timely and efficient manner to the user of user device 105.

In another example, if PSAP routing information 430 includes a URI of an ESRP (e.g., ESRP 150), E-CSCF 125 may provide an IP invite 445 to ESRP 150. IP invite 445 may include the information (e.g., a location query key, a callback number (CBN) if one was provided, etc.) contained in emergency call invite 405. ESRP 150 may receive IP invite 445 and may route an emergency call 450 (e.g., the emergency call initiated by user device 105) to IP PSAP 160 via ESInet 155. IP PSAP 160 may receive emergency call 450, may query 455 a user's location and CBN via LRF/RDF 130 and ALI 165, and may receive a user's location/CBN 460 based on query 455. IP PSAP 160 may provide appropriate emergency services in a timely and efficient manner to the user of user device 105.

Although FIG. 4 shows exemplary components of network portion 400, in other implementations, network portion 400 may contain fewer, different, differently arranged, or additional components than depicted in FIG. 4. In still other implementations, one or more components of network portion 400 may perform one or more other tasks described as being performed by one or more other components of network portion 400.

Figure 5:
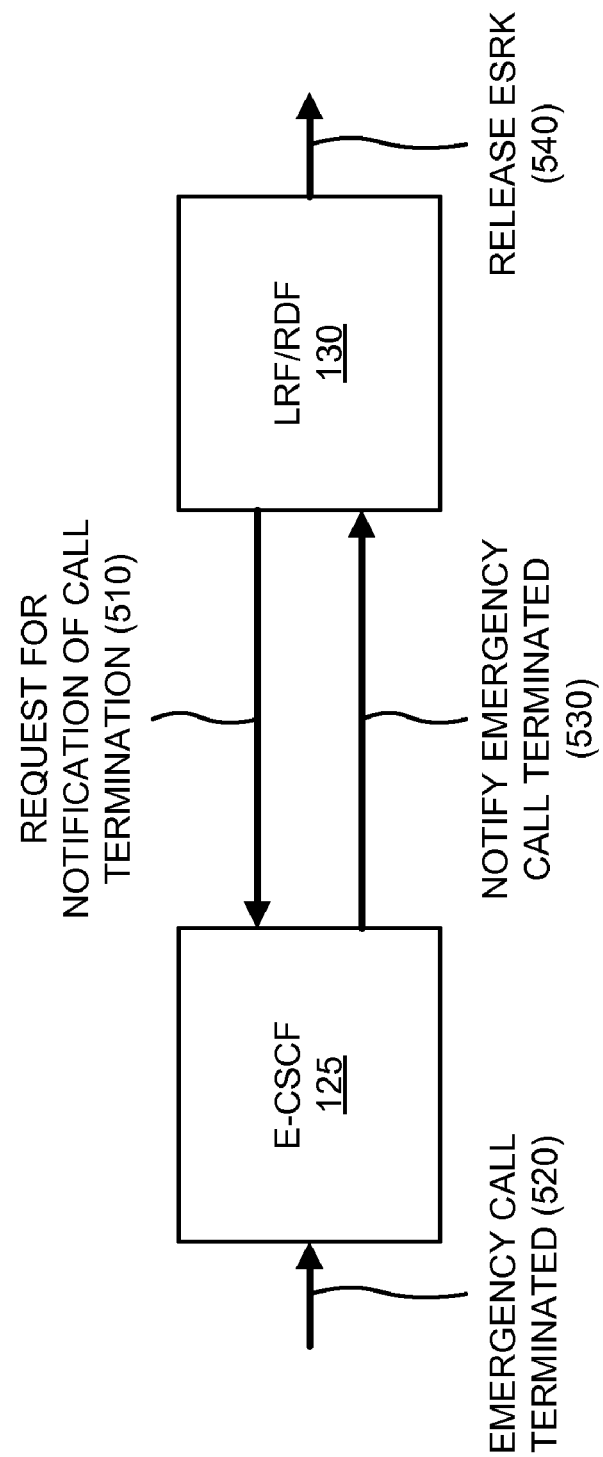
FIG. 5 depicts a diagram of exemplary interactions among components of another exemplary portion of the network depicted in FIG. 1.

FIG. 5 depicts a diagram of exemplary interactions among components of another exemplary portion 500 of network 100. As shown, exemplary network portion 500 may include E-CSCF 125 and LRF/RDF 130. E-CSCF 125 and LRF/RDF 130 may include the features described above in connection with, for example, FIGS. 1-4.

The ESRK allocated to an emergency call (e.g., via PSAP routing information 430) may need to be released upon termination of the emergency call so that the ESRK may be used for future emergency calls. As shown in FIG. 5, to facilitate release of the ESRK allocated to the emergency call, LRF/RDF 130 may send a request 510 (e.g., via a SIP subscribe message) that E-CSCF 125 notify LRF/RDF 130 when an emergency call has terminated. Based on request 510 and if E-CSCF 125 receives an indication 520 that an emergency call terminated, E-CSCF 125 may send a notification 530 (e.g., via a SIP notify message) to LRF/RDF 130 that the emergency call terminated. When LRF/RDF 130 receives notification 530 that the emergency call terminated, LRF/RDF 130 may release the ESRK, as indicated by reference number 540.

Although FIG. 5 shows exemplary components of network portion 500, in other implementations, network portion 500 may contain fewer, different, differently arranged, or additional components than depicted in FIG. 5. In still other implementations, one or more components of network portion 500 may perform one or more other tasks described as being performed by one or more other components of network portion 500.

Figure 6:
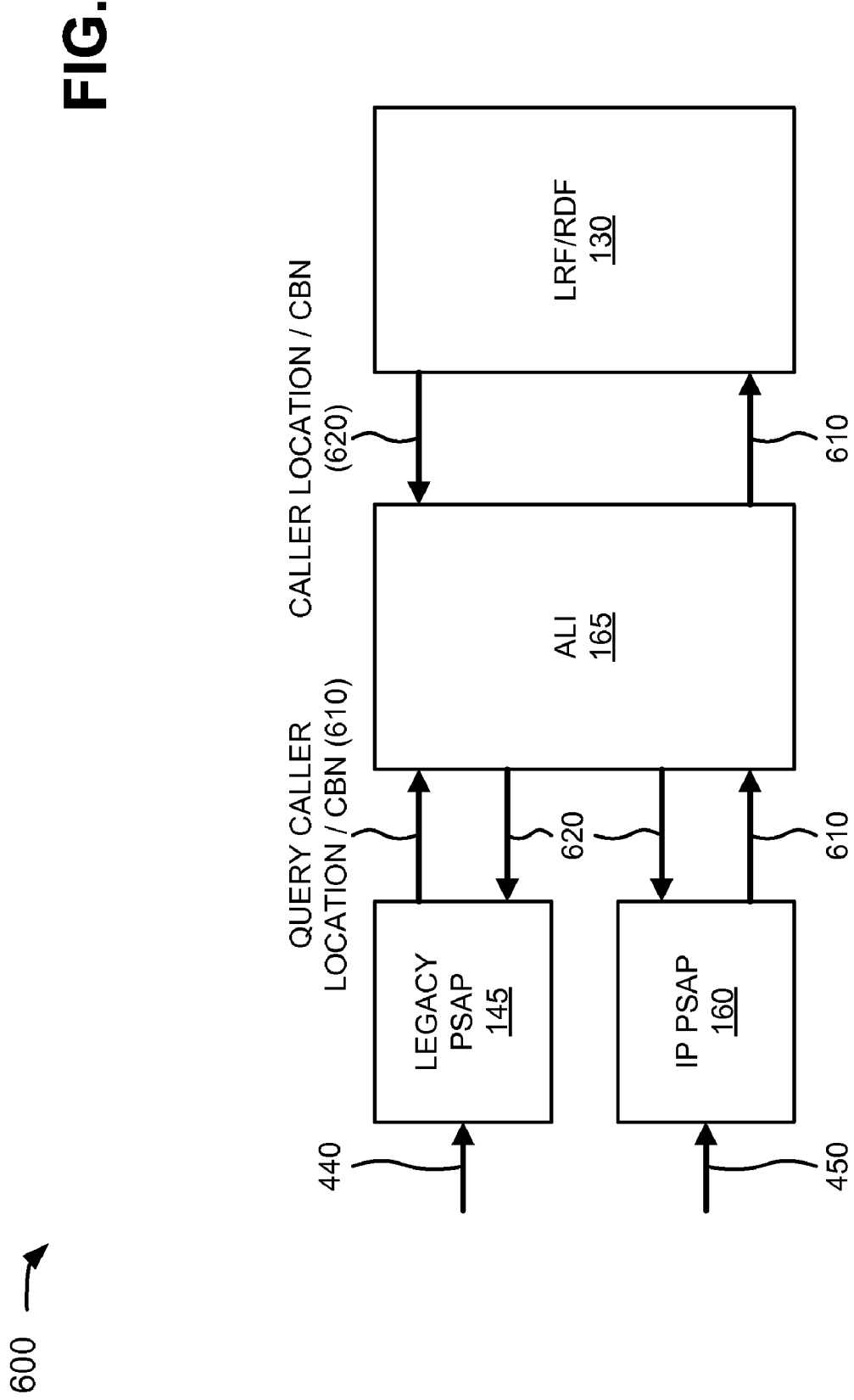
FIG. 6 illustrates a diagram of exemplary interactions among components of still another exemplary portion of the network depicted in FIG. 1.

FIG. 6 illustrates a diagram of exemplary interactions among components of still another exemplary portion 600 of network 100. As shown, exemplary network portion 600 may include LRF/RDF 130, legacy PSAP 145, IP PSAP 160, and ALI 165. LRF/RDF 130, legacy PSAP 145, IP PSAP 160, and ALI 165 may include the features described above in connection with, for example, FIGS. 1-4.

As further shown in FIG. 6, if legacy PSAP 145 receives emergency call 440, legacy PSAP 145 may continue to use an existing interface with LRF/RDF 130 and ALI 165 to query 610 a caller location (e.g., phase one (e.g., cell tower and sector address) and phase two (e.g., GPS coordinates of user device 105) caller locations) and a callback number (CBN) associated with user device 105. Legacy PSAP 145 may provide query 610 to ALI 165 and ALI 165 may forward query 610 to LRF/RDF 130. LRF/RDF 130 may determine a caller location and/or a CBN 620 (e.g., via interaction with location server 110) based on query 610, and may provide caller location/CBN 620 to ALI 165. ALI 165 may forward caller location/CBN 620 to legacy PSAP 145 so that legacy PSAP 145 may provide appropriate emergency services in a timely and efficient manner to the user of user device 105.

If IP PSAP 160 receives emergency call 450, IP PSAP 160 may continue to use an existing interface with LRF/RDF 130 and ALI 165 to query 610 a caller location and a CBN associated with user device 105. IP PSAP 160 may provide query 610 to ALI 165 and ALI 165 may forward query 610 to LRF/RDF 130. LRF/RDF 130 may determine caller location/CBN 620 (e.g., via interaction with location server 110) based on query 610, and may provide caller location/CBN 620 to ALI 165. ALI 165 may forward caller location/CBN 620 to IP PSAP 160 so that IP PSAP 160 may provide appropriate emergency services in a timely and efficient manner to the user of user device 105.

Although FIG. 6 shows exemplary components of network portion 600, in other implementations, network portion 600 may contain fewer, different, differently arranged, or additional components than depicted in FIG. 6. In still other implementations, one or more components of network portion 600 may perform one or more other tasks described as being performed by one or more other components of network portion 600.

Figure 7:
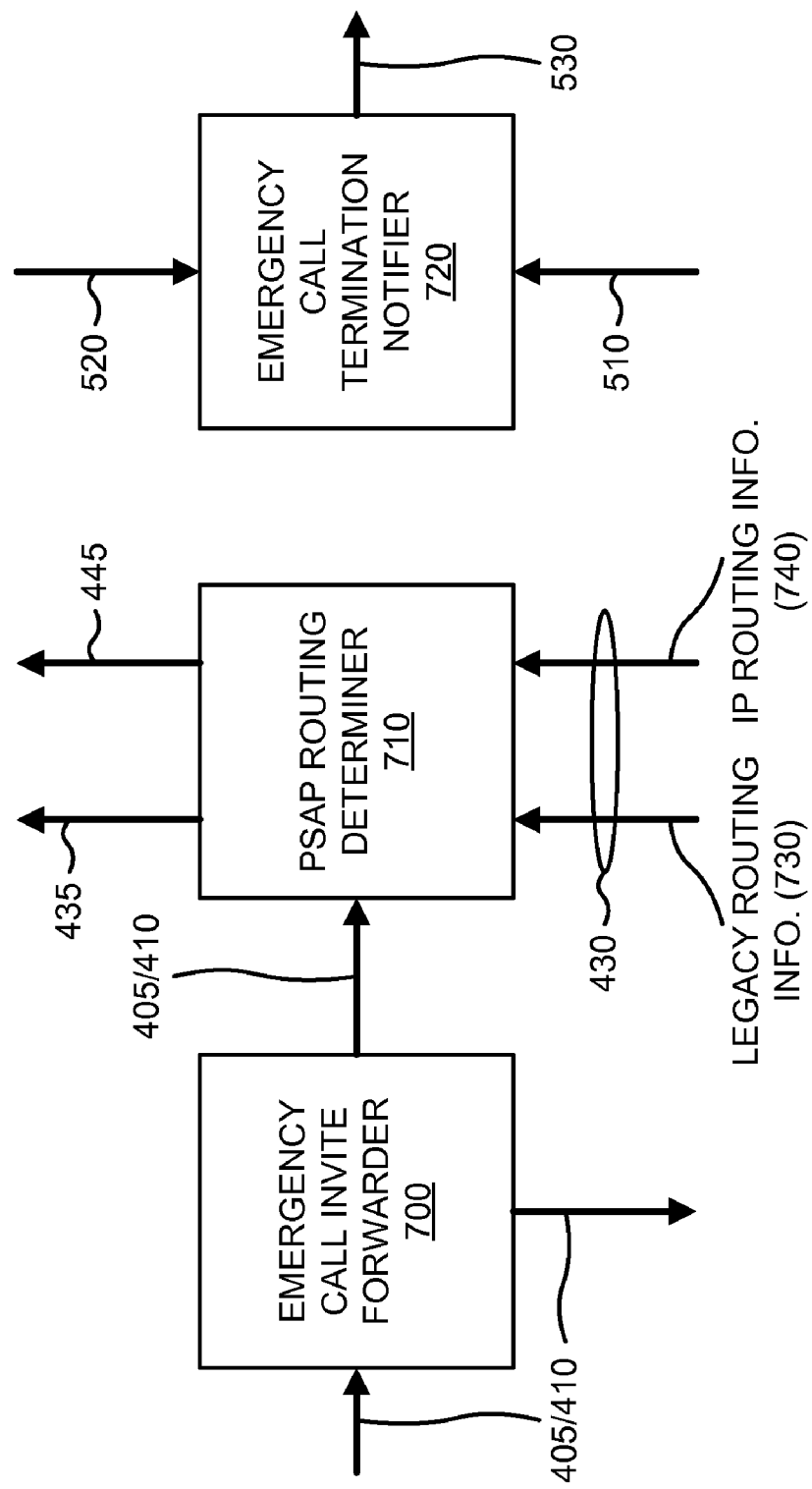
FIG. 7 depicts a diagram of exemplary functional components of the E-CSCF of FIG. 1.

FIG. 7 depicts a diagram of exemplary functional components of E-CSCF 125. In one implementation, the functions described in connection with FIG. 7 may be performed by one or more of the components of device 200 (FIG. 2). As shown, E-CSCF 125 may include an emergency call invite forwarder 700, a PSAP routing determiner 710, and an emergency call termination notifier 720.

Emergency call invite forwarder 700 may include hardware or a combination of hardware and software that may receive emergency call invite 405/emergency session indication 410 from P-CSCF 120, and may forward emergency call invite 405/emergency session indication 410 to LRF/RDF 130. Emergency call invite forwarder 700 may also forward emergency call invite 405/emergency session indication 410 to PSAP routing determiner 710.

PSAP routing determiner 710 may include hardware or a combination of hardware and software that may receive emergency call invite 405/emergency session indication 410 from emergency call invite forwarder 700, and may receive PSAP routing information 430 from LRF/RDF 130. As shown in FIG. 7, PSAP routing information 430 may include legacy routing information 730 (e.g., a URI of TrFO 135) or IP routing information 740 (e.g., a URI of ESRP 150). PSAP routing determiner 710 may determine PSAP routing for the emergency call based on emergency call invite 405/emergency session indication 410 and PSAP routing information 430. For example, if PSAP routing information 430 includes legacy routing information 730, PSAP routing determiner 710 may generate and provide legacy invite 435 to TrFO MSC 135. In another example, if PSAP routing information 430 includes IP routing information 740, PSAP routing determiner 710 may generate and provide IP invite 445 to ESRP 150.

Emergency call termination notifier 720 may include hardware or a combination of hardware and software that may receive request 510 (e.g., for notification of termination of the emergency call) from LRF/RDF 130. Based on request 510 and if emergency call termination notifier 720 receives indication 520 that an emergency call terminated, emergency call termination notifier 720 may notify 530 LRF/RDF 130 that the emergency call terminated.

Although FIG. 7 shows exemplary functional components of E-CSCF 125, in other implementations, E-CSCF 125 may contain fewer, different, differently arranged, or additional functional components than depicted in FIG. 7. In still other implementations, one or more functional components of E-CSCF 125 may perform one or more other tasks described as being performed by one or more other functional components of E-CSCF 125.

Figure 8:
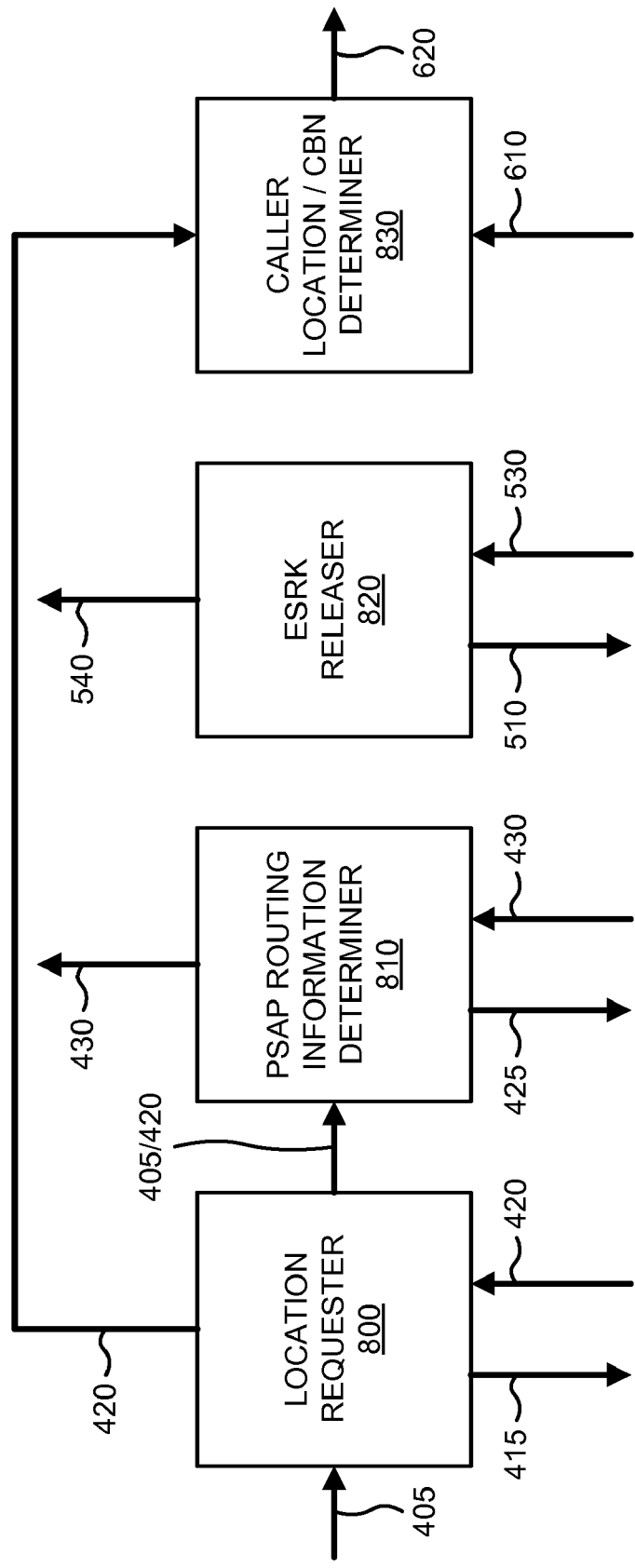
FIG. 8 illustrates a diagram of exemplary functional components of the LRF/RDF of FIG. 1.

FIG. 8 illustrates a diagram of exemplary functional components of LRF/RDF 130. In one implementation, the functions described in connection with FIG. 8 may be performed by one or more of the components of device 200 (FIG. 2). As shown, LRF/RDF 130 may include a location requester 800, a PSAP routing information determiner 810, an ESRK releaser 820, and a caller location/CBN determiner 830.

Location requester 800 may include hardware or a combination of hardware and software that may receive emergency call invite 405 from E-CSCF 125, and may generate location request 415 based on emergency call invite 405. Location requester 800 may provide location request 415 to location server 110, and location server 110 may determine user device location 420 (e.g., GPS coordinates associated with user device 105) based on location request 415. Location server 110 may provide user device location 420 to location requester 800, and location requester 800 may provide emergency call invite 405 and user device location 420 to PSAP routing information determiner 810. Location requester 800 may also provide user device location 420 to caller location/CBN determiner 830.

PSAP routing information determiner 810 may include hardware or a combination of hardware and software that may receive emergency call invite 405 and user device location 420 from location requester 800, and may formulate query 425 for PSAP routing information based on emergency call invite 405 and user device location 420. PSAP routing information determiner 810 may provide query 425 to CRDB 167, and CRDB 167 may return appropriate PSAP routing information 430 for the emergency call based on query 425. PSAP routing information determiner 810 may receive PSAP routing information 430 and may provide PSAP routing information 430 to E-CSCF 125 (e.g., via a "300" multiple choice SIP message).

ESRK releaser 820 may include hardware or a combination of hardware and software that may provide request 510 (e.g., for notification of termination of the emergency call) to E-CSCF 125, and may receive, from E-CSCF 125, notification 530 that the emergency call terminated. When ESRK releaser 820 receives notification 530 that the emergency call terminated, ESRK releaser 820 may release the ESRK, as indicated by reference number 540.

Caller location/CBN determiner 830 may include hardware or a combination of hardware and software that may receive user device location 420 from location requester 800, and may receive, from ALI 165, query 610 for a caller location and CBN associated with user device 105. Caller location/CBN determiner 830 may determine caller location/CBN 620 (e.g., via interaction with location server 110) based on query 610, and may provide caller location/CBN 620 to ALI 165.

Although FIG. 8 shows exemplary functional components of LRF/RDF 130, in other implementations, LRF/RDF 130 may contain fewer, different, differently arranged, or additional functional components than depicted in FIG. 8. In still other implementations, one or more functional components of LRF/RDF 130 may perform one or more other tasks described as being performed by one or more other functional components of LRF/RDF 130.

FIG. 9 depicts a flow chart of an exemplary process 900 for routing an emergency call, in IMS and over an SAE/EPC network, to either a legacy PSAP or an IP PSAP according to implementations described herein. In one implementation, process 900 may be performed by E-CSCF 125. In another implementation, some or all of process 900 may be performed by another device or group of devices, including or excluding E-CSCF 125.

As shown in FIG. 9, process 900 may include receiving an emergency call invite generated by a user device associated with an IMS media gateway (block 910), forwarding the emergency call invite to a LRF/RDF for determining PSAP routing information (block 920), and receiving PSAP routing information from the LRF/RDF based on the emergency call invite (block 930). For example, in implementations described above in connection with FIG. 4, E-CSCF 125 may receive emergency call invite 405 from P-CSCF 120 and may interact with LRF/RDF 130 to obtain information for routing the emergency call to a correct PSAP. In one example, E-CSCF 125 may provide emergency call invite 405 to LRF/RDF 130. LRF/RDF 130 may receive emergency call invite 405, and may formulate query 425 for PSAP routing information based on information provided in emergency call invite 405. LRF/RDF 130 may provide query 425 for PSAP routing information to CRDB 167, and CRDB 167 may return appropriate PSAP routing information 430 for the emergency call based on query 425. LRF/RDF 130 may provide PSAP routing information 430 to E-CSCF 125 (e.g., via a "300" multiple choice SIP message).

As further shown in FIG. 9, the emergency call invite may be routed to a legacy PSAP based on the PSAP routing information (block 940), or the emergency call invite may be routed to an IP PSAP based on the PSAP routing information (block 950). For example, in implementations described above in connection with FIG. 4, E-CSCF 125 may forward emergency call invite 405 to either TrFO 135 or ESRP 150 based on PSAP routing information 430. In one example, if PSAP routing information 430 includes a URI of TrFO MSC 135, E-CSCF 125 may provide legacy invite 435 to TrFO MSC 135. TrFO MSC 135 may receive legacy invite 435 and may translate legacy invite 435 into a format that may be understood by legacy devices. Based on legacy invite 435, TrFO MSC 135 may provide emergency call 440 to legacy PSAP 145 via a dedicated trunk (e.g., via SR 140). In another example, if PSAP routing information 430 includes a URI of ESRP 150, E-CSCF 125 may provide IP invite 445 to ESRP 150. ESRP 150 may receive IP invite 445 and may route emergency call 450 to IP PSAP 160 via ESInet 155.

Returning to FIG. 9, a request that a notification be sent upon termination of the emergency call may be received from the LRF/RDF (block 960), an indication of termination of the emergency call be received (block 970), and the LRF/RDF may be notified that the emergency call terminated so that the LRF/RDF may release an ERSK associated with the emergency call (block 980). For example, in implementations described above in connection with FIG. 5, LRF/RDF 130 may request 510 (e.g., via a SIP subscribe message) that E-CSCF 125 notify LRF/RDF 130 when an emergency call has terminated. Based on request 510 and if E-CSCF 125 receives indication 520 that an emergency call terminated, E-CSCF 125 may notify 530 (e.g., via a SIP notify message) LRF/RDF 130 that the emergency call terminated.

FIGS. 10A and 10B illustrate a flow chart of an exemplary process 1000 for routing an emergency call in IMS and over an SAE/EPC network according to implementations described herein. In one implementation, process 1000 may be performed by LRF/RDF 130. In another implementation, some or all of process 1000 may be performed by another device or group of devices, including or excluding LRF/RDF 130.

As shown in FIG. 10A, process 1000 may include receiving an emergency call invite generated by a user device associated with an IMS media gateway (block 1010), requesting, from a location server, location information associated with the user device based on the emergency call invite (block 1020), and receiving, from the location server and based on the request, the location information associated with the user device (block 1030). For example, in implementations described above in connection with FIG. 4, LRF/RDF 130 may receive emergency call invite 405 and may check for caller location information (e.g., associated with the user of user device 105). LRF/RDF 130 may generate location request 415 based on emergency call invite 405. Location request 415 may include a request for location information (e.g., GPS coordinates) associated with user device 105. LRF/RDF 130 may provide location request 415 to location server 110, and location server 110 may determine user device location 420 (e.g., GPS coordinates associated with user device 105) based on location request 415. Location server 110 may provide user device location 420 to LRF/RDF 130.

As further shown in FIG. 10A, a query for PSAP routing information may be provided to a CRDB based on the emergency call invite and the location information (block 1040), and PSAP routing information for the emergency call invite may be received from the CRDB based on the query (block 1050). For example, in implementations described above in connection with FIG. 4, if a location parameter (e.g., a SectorID parameter) is included in emergency call invite 405 (e.g., within a P-Access-Network-Info (PANI) portion of invite 405), LRF/RDF 130 may utilize information provided in the location parameter (and/or user device location 420) to formulate query 425 for PSAP routing information. LRF/RDF 130 may provide query 425 for PSAP routing information to CRDB 167, and CRDB 167 may return appropriate PSAP routing information 430 for the emergency call based on query 425 (e.g., based on user device location 420, the location parameter, etc.). PSAP routing information 430 may include an ESRK and an identifier (e.g., a URI) for an ESRP (e.g., ESRP 150) if a determined PSAP is IP-capable. If the determined PSAP is not IP-capable, PSAP routing information 430 may include an ESRK and an identifier (e.g., a URI) for a TrFO MSC (e.g., TrFO MSC 135). LRF/RDF 130 may receive PSAP routing information 430.

As shown in FIG. 10B, the PSAP routing information may be forwarded to an E-CSCF for routing the emergency call invite (block 1060), a request for user device location and a callback number of the user device may be received from a PSAP handling the emergency call (block 1070), and user device location and the callback number of the user device may be provided to the PSAP handling the emergency call (block 1080). For example, in implementations described above in connection with FIGS. 4 and 6, LRF/RDF 130 may provide PSAP routing information 430 to E-CSCF 125 (e.g., via a "300" multiple choice SIP message). E-CSCF 125 may receive PSAP routing information 430 from LRF/RDF 130 and may forward emergency call invite 405 to either TrFO 135 or ESRP 150 based on PSAP routing information 430. If legacy PSAP 145 receives emergency call 440, legacy PSAP 145 may continue to use an existing interface with LRF/RDF 130 and ALI 165 to query 610 a caller location and CBN associated with user device 105. Legacy PSAP 145 may provide query 610 to ALI 165 and ALI 165 may forward query 610 to LRF/RDF 130. LRF/RDF 130 may determine caller location/CBN 620 based on query 610, and may provide caller location/CBN 620 to ALI 165. ALI 165 may forward caller location/CBN 620 to legacy PSAP 145.

As further shown in FIG. 10B, a notification of termination of the emergency call may be received from the E-CSCF (block 1090), and an ERSK may be released based on the notification (block 1095). For example, in implementations described above in connection with FIG. 5, if E-CSCF 125 receives indication 520 that an emergency call terminated, E-CSCF 125 may notify 530 (e.g., via a SIP notify message) LRF/RDF 130 that the emergency call terminated. When LRF/RDF 130 receives notification 530 that the emergency call terminated, LRF/RDF 130 may release the ESRK, as indicated by reference number 540.

Implementations described herein may provide systems and/or methods that may support emergency service in IMS over SAE/EPC networks. The systems and/or methods may route IMS-based emergency calls to either legacy SRs or ESRPs depending on a capability of a PSAP. With the systems and/or methods, supporting emergency calls to legacy PSAPs in IMS may preclude installing and maintaining thousands of dedicated trunks to legacy SRs from a few IMS media gateways, and may result in significant cost savings. The systems and/or methods may also take advantage of the conversion of legacy MSCs to TrFO MSCs, because TrFO MSCs enable emergency calls to be routed without using dedicated trunks.

The foregoing description of implementations provides illustration and description, but is not intended to be exhaustive or to limit the invention to the precise form disclosed.

Modifications and variations are possible in light of the above teachings or may be acquired from practice of the invention.

For example, while series of blocks have been described with regard to FIGS. 9-10B, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
    receiving, by the computing device, an emergency call invite generated by a user device associated with an Internet protocol (IP) multimedia subsystem (IMS) media gateway;
    forwarding, by the computing device, the emergency call invite to a location resource function/route determination function (LRF/RDF) device for determining public safety answering point (PSAP) routing information;
    receiving, by the computing device and from the LRF/RDF device, the PSAP routing information based on the emergency call invite, the PSAP routing information including one of legacy PSAP routing information or IP PSAP routing information, when the PSAP routing information includes the legacy PSAP routing information, the PSAP routing information includes an emergency service routing key (ESRK) and an identifier or address for a transcoder free operation mobile switching center (TrFO MSC), the identifier or address for the TrFO MSC including a session initiation protocol (SIP) uniform resource identifier (URI) of the TrFO MSC;
    routing, by the computing device, the emergency call invite to a legacy PSAP when the PSAP routing information includes legacy PSAP routing information; and
    routing, by the computing device, the emergency call invite to an IP PSAP when the PSAP routing information includes IP PSAP routing information.

2. The computing device-implemented method of claim 1, where the user device is associated with IMS over a system architecture evolution/evolved packet core (SAE/EPC) network.

3. The computing device-implemented method of claim 1, where the emergency call invite includes:
    an emergency session indication,
    an emergency/public user identifier, and
    a telephone uniform resource identifier (Tel URI) associated with the public user identifier.

4. The computing device-implemented method of claim 1, where the IP PSAP routing information includes an emergency service routing key (ESRK) and an identifier for an emergency service routing proxy (ESRP).

5. The computing device-implemented method of claim 1, further comprising:
    receiving, from the LRF/RDF device, a request that a notification be sent upon termination of the emergency call invite;
    receiving an indication of termination of the emergency call invite; and
    notifying the LRF/RDF device, based on the request, that the emergency call invite terminated, where the LRF/RDF device releases an emergency service routing key (ESRK) associated with the emergency call invite based on the notification.

6. The computing device-implemented method of claim 1, where the computing device comprises an emergency call session control function (E-CSCF) device.

7. The computing device-implemented method of claim 1, where the user device comprises one or more of:
    a radiotelephone,
    a personal communications system (PCS) terminal,
    a wireless telephone,
    a cellular telephone,
    a smart phone,
    a personal digital assistant (PDA), or
    a laptop computer with a broadband air card.

8. A computing device-implemented method, comprising:
    receiving, by the computing device, an emergency call invite generated by a user device associated with an Internet protocol (IP) multimedia subsystem (IMS) media gateway;
    providing, by the computing device and to a call routing database (CRDB) server, a query for public safety answering point (PSAP) routing information based on the emergency call invite;
    receiving, by the computing device and from the CRDB server, PSAP routing information for the emergency call invite;
    forwarding, by the computing device and to an emergency call session control function (E-CSCF) device, the PSAP routing information for the emergency call invite, the E-CSCF device routing the emergency call invite to a legacy PSAP or an IP PSAP based on the PSAP routing information;
    receiving, from the E-CSCF device, a notification of termination of the emergency call invite; and
    releasing an emergency service routing key (ESRK) associated with the emergency call invite based on the notification.

9. The computing device-implemented method of claim 8, further comprising:
    requesting, from a location server and based on the emergency call invite, location information associated with the user device; and
    receiving, from the location server, the location information associated with the user device.

10. The computing device-implemented method of claim 8, further comprising:
    receiving, from the legacy PSAP or the IP PSAP, a request for a location of the user device and a callback number associated with the user device; and
    providing, to the legacy PSAP or the IP PSAP, the location of the user device and the callback number associated with the user device.

11. The computing device-implemented method of claim 8, where the user device is associated with IMS over a system architecture evolution/evolved packet core (SAE/EPC) network.

12. The computing device-implemented method of claim 8, where the emergency call invite includes:
 an emergency session indication,
 an emergency/public user identifier, and
 a telephone uniform resource identifier (Tel URI) associated with the emergency/public user identifier.

13. The computing device-implemented method of claim 8, where the computing device comprises a location resource function/route determination function (LRF/RDF) device.

14. A device, comprising:
 a memory to store a plurality of instructions; and
 a processor to execute instructions in the memory to:
  receive an emergency call invite generated by a user device associated with an Internet protocol (IP) multimedia subsystem (IMS) media gateway,
  forward the emergency call invite to a location resource function/route determination function (LRF/RDF) device for determining public safety answering point (PSAP) routing information,
  receive, from the LRF/RDF device, the PSAP routing information based on the emergency call invite, the PSAP routing information including one of legacy PSAP routing information or IP PSAP routing information, when the PSAP routing information includes legacy PSAP routing information, the legacy PSAP routing information including an emergency service routing key (ESRK) and an identifier for a transcoder free operation mobile switching center (TrFO MSC),
  route the emergency call invite to a legacy PSAP when the PSAP routing information includes legacy PSAP routing information, and
  route the emergency call invite to an IP PSAP when the PSAP routing information includes IP PSAP routing information.

15. The device of claim 14, where the IP PSAP routing information includes an emergency service routing key (ESRK) and an identifier for an emergency service routing proxy (ESRP).

16. The device of claim 14, where the processor is further to execute instructions to:
 receive, from the LRF/RDF device, a request that a notification be sent upon termination of the emergency call invite,
 receive an indication of termination of the emergency call invite, and
 notify the LRF/RDF device, based on the request, that the emergency call invite terminated, where the LRF/RDF device releases an emergency service routing key (ESRK) associated with the emergency call invite based on the notification.

17. A device, comprising:
 a memory to store a plurality of instructions; and
 a processor to execute instructions in the memory to:
  receive an emergency call invite generated by a user device associated with an Internet protocol (IP) multimedia subsystem (IMS) media gateway,
  request, from a location server and based on the emergency call invite, location information associated with the user device,
  receive, from the location server, the location information associated with the user device,
  provide, to a call routing database (CRDB) server, a query for public safety answering point (PSAP) routing information based on the emergency call invite and the location information,
  receive, from the CRDB server, PSAP routing information for the emergency call invite, and
  forward, to an emergency call session control function (E-CSCF) device, the PSAP routing information for the emergency call invite, the E-CSCF device routing the emergency call invite to a legacy PSAP or an IP PSAP based on the PSAP routing information.

18. The device of claim 17, where the processor is further to execute instructions to:
 receive, from the legacy PSAP or the IP PSAP, a request for a location of the user device and a callback number associated with the user device, and
 provide, to the legacy PSAP or the IP PSAP, the location of the user device and the callback number associated with the user device.

19. The device of claim 17, where the processor is further to execute instructions to:
 receive, from the E-CSCF device, a notification of termination of the emergency call invite, and
 release an emergency service routing key (ESRK) associated with the emergency call invite based on the notification.

20. The device of claim 17, where the emergency call invite includes:
 an emergency session indication,
 an emergency/public user identifier, and
 a telephone uniform resource identifier (Tel URI) associated with the emergency/public user identifier.

21. The device of claim 17, where the device comprises a location resource function/route determination function (LRF/RDF) device.

* * * * *